Jan. 10, 1939.　　　　S. H. MOSS　　　　2,143,833
RUBBER STAMP
Filed Feb. 26, 1937

INVENTOR.
Samuel H. Moss
BY
Clark & Ott
ATTORNEYS

Patented Jan. 10, 1939

2,143,833

UNITED STATES PATENT OFFICE 2,143,833

RUBBER STAMP

Samuel H. Moss, Brooklyn, N. Y.

Application February 26, 1937, Serial No. 127,949

3 Claims. (Cl. 101—379)

This invention relates to rubber stamps and has particular reference to certain improvements in the construction of the base and die mount, with the board object in view of providing a more effectual and lasting connection between the base and die mount and an improved method of establishing said connection.

Other objects, features, and advantages of the invention will be apparent from the following detailed description considered in connection with the accompanying drawing in which.

Figure 1:
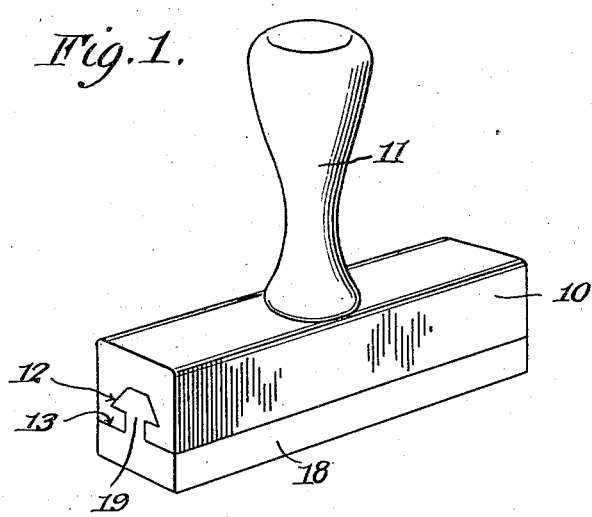
Fig. 1 is a perspective view of a rubber stamp constructed in accordance with the invention.
Figure 2:
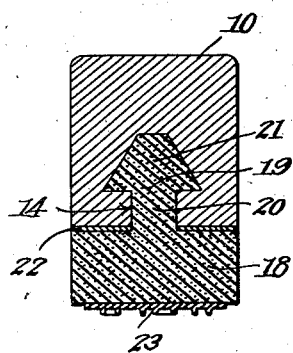
Fig. 2 is an enlarged cross sectional view of Fig. 1.

Referring to the drawing by characters of reference, 10 designates the base which is preferably of wood or an equivalent rigid material having a handle 11 and provided with a longitudinally extending groove 12 which opens through its lower face 13. The groove is provided with spaced parallel outer side walls 14 perpendicular to the outer surface 13 of the base and with outwardly extending lateral walls 15 parallel to the outer surface 13 of the base. The groove is also provided with inwardly converging inner side walls 16 and an inner lateral wall 17 joining said converging inner side walls 16.

Figure 3:
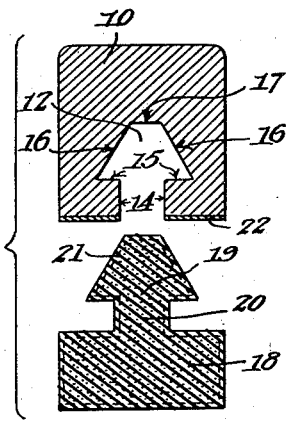
Fig. 3 is an exploded view of the stamp showing the die mount separated from the base.

According to the invention the die mount 18 is of a suitable sponge rubber and comprises a rib 19 having an enlarged head 21 and a depending reduced portion 20. This rib 19 is coextensive with the length of the die mount 18 and is complementary to the compound groove 12 in the base when inserted therein and compressed to its dash line position illustrated in Fig. 3. In other words in the normally expanded condition, the size of the rib in cross section is normally larger than the cross sectional area of retaining opening 12 in the base.

In assembling, a suitable adhesive is applied to the surface 22 and subsequently the rib 19 is positioned into the retaining opening 12. Thereafter heat and pressure is applied simultaneously to both the die mount and stamp to provide a suitable bond between the exterior surface of rib 19 and the inner faces of opening 12 which continue to hold the rib under compression and wedgeably thereagainst as is well understood.

The type strip or strips 23 are secured to the outer face of the die mount in any desired manner to complete the rubber stamp.

In the broader aspects of the invention, I do not desire to be understood as limiting its embodiments to details herein described and shown illustratively as a wide variety of modifications may be made within the scope of the appended claims without departing from the spirit of the invention.

What is claimed is:

1. In a stamp, a base having a longitudinally disposed groove defining inclined sides and vertically extending sides offset in respect to said inclined sides and faces extending laterally of said vertically extending sides and merging therewith and said inclined sides, an expandible and contractible die mount comprising a rib normally larger than said groove and disposed wedgeably therein under compression by said sides and faces, and a handle secured to said base.

2. In a stamp, a base having a longitudinally disposed groove defining inclined sides and vertically extending sides offset in respect to said inclined sides and faces extending laterally of vertically extending sides and merging therewith and said inclined sides, said inclined sides and faces defining an expanded part of said groove and said vertically extending sides defining a reduced part of said groove in communication with said expanded part, an expandible and contractible type carrying mount having a rib comprising a head normally greater in cross sectional area than said expanded part and a reduced part having a greater cross sectional area than said reduced part, said inclined sides and said faces compressing said head and said vertically extending sides compressing said reduced part, and a handle carried by said base.

3. In a stamp, a base having a longitudinally disposed groove defining inclined sides and vertically extending spaced sides spaced from said inclined sides and faces extending laterally of vertically extending sides and merging therewith and said inclined sides, said inclined sides and faces defining an expanded part of said groove and said vertically extending sides defining a reduced part of said groove in communication with said expanded part; an expandible and contractible type carrying mount comprising a rib having a head normally greater in cross sectional area than said expanded part and provided with inclined portions wedgeably compressed by said inclined sides and horizontally arranged portions wedgeably compressed by said faces, and a reduced neck normally greater in cross sectional area than said reduced part and compressed by said spaced vertically extending sides; and a handle carried by said base.

SAMUEL H. MOSS.